(12) United States Patent
Merrill et al.

(10) Patent No.: US 10,252,749 B2
(45) Date of Patent: Apr. 9, 2019

(54) SPINDLE SYSTEM FOR WHEEL ALIGNMENT CORRECTION

(71) Applicants: Compagnie Generale des Etablissements Michelin, Clermont-Ferrand (FR); Michelin Recherche et Technique S.A., Granges-Paccot (CH); Zachary Alexander Merrill, Greenville, SC (US); Matthew J Hanlon, Gray Court, SC (US)

(72) Inventors: Zachary Alexander Merrill, Greenville, SC (US); Matthew J Hanlon, Gray Court, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 107 days.

(21) Appl. No.: 15/521,674

(22) PCT Filed: Nov. 18, 2015

(86) PCT No.: PCT/US2015/061388
§ 371 (c)(1),
(2) Date: Apr. 25, 2017

(87) PCT Pub. No.: WO2016/081629
PCT Pub. Date: May 26, 2016

(65) Prior Publication Data
US 2017/0240206 A1 Aug. 24, 2017

Related U.S. Application Data

(63) Continuation of application No. PCT/US2014/066158, filed on Nov. 18, 2014.

(51) Int. Cl.
*B62D 17/00* (2006.01)
*B60B 27/00* (2006.01)
(Continued)

(52) U.S. Cl.
CPC ............ *B62D 17/00* (2013.01); *B60B 27/001* (2013.01); *B60B 27/02* (2013.01); *B60B 35/02* (2013.01);
(Continued)

(58) Field of Classification Search
CPC ....... B60B 27/00; B60B 35/02; B60B 27/001; B60G 2200/46; B60G 2206/50; B60G 2206/99; B62D 17/00
(Continued)

(56) References Cited

U.S. PATENT DOCUMENTS 3,901,568 A * 8/1975 Gadd .................... F16C 19/548
384/589
4,287,972 A * 9/1981 Petrak ................ B60K 17/3515
192/54.2
(Continued)

FOREIGN PATENT DOCUMENTS

FR 2965786 A1 4/2012
WO 2013104427 A1 7/2013

OTHER PUBLICATIONS

European Patent Office, International Search Report and Written Opinion of the International Searching Authority, published Jul. 17, 2015, European Patent Office, RijSwijk, Netherlands, pp. 1-9.

*Primary Examiner* — S. Joseph Morano
*Assistant Examiner* — Jean W Charleston
(74) *Attorney, Agent, or Firm* — Neal P. Pierotti

(57) ABSTRACT

A spindle sleeve and washer for adjusting the camber, toe, or thrust angle of a vehicle wheel to a desired predetermined
(Continued)

angle which allows for use of existing hub and spindle assembly without permanent modification to the vehicle.

18 Claims, 7 Drawing Sheets

(51) Int. Cl.
*B60B 27/02* (2006.01)
*B60G 9/00* (2006.01)
*B60B 35/02* (2006.01)
*B60B 35/00* (2006.01)

(52) U.S. Cl.
CPC ............ *B60G 9/00* (2013.01); *B60B 27/0078* (2013.01); *B60B 35/009* (2013.01); *B60G 2200/46* (2013.01); *B60G 2200/462* (2013.01); *B60G 2200/4622* (2013.01); *B60G 2204/61* (2013.01); *B60G 2206/50* (2013.01); *B60G 2206/99* (2013.01)

(58) Field of Classification Search
USPC ........................................................ 301/126
See application file for complete search history.

(56) References Cited

U.S. PATENT DOCUMENTS

| | | | | |
|---|---|---|---|---|
| 4,555,197 A | * | 11/1985 | Erickson | ................ F16D 11/14 |
| | | | | 192/69.43 |
| 5,174,839 A | * | 12/1992 | Schultz | ................ B60C 23/003 |
| | | | | 152/415 |
| 5,197,786 A | | 3/1993 | Eschenburg | |
| 2011/0291468 A1 | * | 12/2011 | Rieger | ............... B60B 27/0005 |
| | | | | 301/105.1 |

* cited by examiner

SPINDLE SYSTEM FOR WHEEL ALIGNMENT CORRECTION

CROSS-REFERENCE TO RELATED APPLICATIONS

The present application is a national stage entry under 35 U.S.C. § 371 and claims priority to PCT/US2015/061388 filed on Nov. 18, 2015. PCT/US2015/061388 claims priority to PCT/US2014/066158 which was filed on Nov. 18, 2014. The entire contents of PCT/US2015/061388 and PCT/US2014/066158 are incorporated by reference herein in their entireties for all purposes.

FIELD OF THE INVENTION

The subject matter of the present invention relates to a method and apparatus to adjust camber, toe and/or thrust of a tire attached to an axle spindle stub.

BACKGROUND OF THE INVENTION

The alignment of a vehicle's wheel plane relative to the path traveled by the vehicle affects not only the handling of the vehicle but also affects the wear on the tires. As used here, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even a fourth of one degree can impact tire wear. Abnormal tire wear has been observed in certain applications with even smaller camber angles changes. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Thrust is the resulting direction of travel of an axle as opposed to the direction that might be expected from the orientation of the tires on the axle. Generally speaking, toe changes of even one-tenth of a degree can have an impact on tire wear.

The typical trailer axle is made by welding a pair of spindle forgings onto a piece of axle tubing then machining the precision surfaces of both spindles simultaneously in a lathe process. The resulting axle is near perfectly straight; i.e., each spindle axis possesses zero camber and zero toe. When a typical axle is installed under a vehicle (used herein to refer to both motorized vehicles as well as trailers) and placed into normal operation under typical loading conditions, the camber does not remain at zero. The axle under load, although quite rigid, does flex. The flexing of the axle occurs because the suspension is attached to the axle at load transfer points which are significantly inboard of the ends of the axle, but the tires support the weight of the vehicle by means of attachment points which are relatively near the outboard ends of the axle. As a result of this geometry, the weight of the vehicle imposes a bending moment on the axle which in turn causes upward deflection of the ends of the axle resulting in the tires presenting a slight negative camber. As the load increases, the more negative the camber becomes. At the typical maximum legal tandem axle load in the US, it would not be unusual for the wheel camber angle to reach approximately 0.5 degrees. The contribution of tire alignment to tire wear can be particularly problematic with vehicles used for transporting heavy loads.

Once the weight is removed, the axle may recover and again affect the alignment of the wheels. Because of factors such as the additional costs and amount of material that would be required, increasing the stiffness of the axle to resolve camber issues may not be practical.

Even with the same amount of camber on each axle spindle, axle camber affects the tires differently depending on their individual wheel end position on the vehicle because most road surfaces are not flat transversely across the road. The road surface is either crowned or sloped (by about 1.5% on average) so that water will evacuate from the road surface. Trucks, in most of the world, generally operate in the right most lane, and the right most lane is usually sloped very slightly to the right. This means that all the while the vehicle is traveling on the road way, there is a gravitational pull on the rig that is pulling the vehicle to the right. This pull is resisted through the tire contact patch and the tire transmits this force to the axle by transmitting the required force opposite of the direction of pull through its interface with its wheel. The result is that as the tire rolls down the highway, the contact patch is shifts leftward with respect to the wheel its wheel center. At full load and at normal pressure on a typical NGWBS tire, this shift has an effect on tire shoulder wear that us roughly the equivalent of a 0.2 degree shift in wheel camber. This means that, although the left and the right wheel may each measure approximately −0.5 degree of camber, when the shift effect is considered, the effective camber angle on the left side tires is approximately −0.7 degree, and the effective camber angle on the right side tires is approximately −0.3 degree. As a consequence of this phenomenon, the LH tires usually experience worse inboard shoulder wear than the RH tires.

When a typical tandem axle vehicle (tractor or trailer) turns, the dynamics of the vehicle favor lateral grip by the forward axle tires. As a result the pivot point of the vehicle shifts toward the forward axle tires and the rear axle tires will tend to have greater slip laterally as the vehicle negotiates a turn maneuver. For this reason, the rear tires on a tandem axle pair receive more scrub and have a faster wear rate than the tires on the forward axle. Scrub tends to arrest the development of irregular wear and thus the rear tires usually are less affected by the camber issue than are the tires on the forward axle.

So as a consequence, the tire irregular wear issue is usually worst on the inboard side of the LF tire. Next worst is the LR tire. The RF tire come next but is sometimes similar in severity to the LR. The most even wear usually is found on the RR tire depending upon the particular application, load, and routes normally traveled. It should be obvious that in countries such as Australia, where drivers drive on the left side of the road instead of the right side, the above would be reversed.

Therefore, a need exists for improved methods and apparatus for adjusting or correcting axle alignment. A system that allows for adjustment while minimizing the amount of disassembly and labor required would be particularly advantageous. Additional usefulness would be provided by a system that allows for adjustment of the alignment of an axle using hardware that can be used for the left or right sides of the vehicle. Further benefits would be found with an apparatus that enables a precise camber selection for each individual wheel end of the axles in a tandem pair.

SUMMARY OF THE INVENTION

Aspects and advantages of the invention will be set forth in part in the following description, or may be obvious from the description, or may be learned through practice of the invention.

In one embodiment, the present invention provides an apparatus for adjusting the angular position of a vehicle wheel attached to a spindle comprising a spindle sleeve having an outer surface of revolution about a first axis, an inner surface of revolution formed about a second axis and a washer which engages both the spindle sleeve and spindle thereby preventing rotation of the spindle sleeve about the spindle, wherein the first axis and second axis are oriented at a desired angle to induce the desired camber, toe, and thrust angles of the wheel.

In another embodiment, the apparatus comprises a spindle sleeve for adjusting the angular position of a vehicle wheel attached to a spindle having an outer surface of revolution about a first axis, an inner surface of revolution formed about a second axis and a washer which engages both the spindle sleeve and spindle thereby preventing rotation of the spindle sleeve about the spindle, wherein the first axis and second axis are oriented at a desired angle to induce the desired camber, toe, and thrust angles of the wheel and where the spindle sleeve possesses a slot in the outboard portion of the spindle sleeve, the slot extending from the outer surface of revolution to the inner surface of revolution, and the washer possesses a radially inward oriented protrusion, or "tooth," which extends through the slot, whereby, the radially inward oriented protrusion on the washer engages a keyway on the spindle attached to the vehicle preventing the spindle sleeve from rotating about the spindle.

In another embodiment, the apparatus comprises a spindle sleeve for adjusting the angular position of a vehicle wheel attached to a spindle having an outer surface of revolution about a first axis, an inner surface of revolution formed about a second axis and a washer which engages both the spindle sleeve and spindle thereby preventing rotation of the spindle sleeve about the spindle, wherein the first axis and second axis are oriented at a desired angle to induce the desired camber, toe, and thrust angles of the wheel, and the spindle sleeve possesses a plurality of slots in the outboard portion of the spindle sleeve, the slots extending from the outer surface of revolution to the inner surface of revolution, and the washer possesses a plurality of radially inward oriented protrusions, each of which extend into one of the slots in the spindle sleeve.

In yet a further embodiment, the apparatus wherein the washer possesses a radially inward extending protrusion which extends radially past the inner surface of revolution of the spindle sleeve forming an "alignment tooth," whereby the alignment tooth engages a keyway on a spindle attached to the vehicle preventing the spindle sleeve from rotating about the spindle.

These embodiments, and the embodiments that follow, provide an apparatus which enables adjustment of toe, camber and thrust angles of a tire mounted to an otherwise non-adjustable axle spindle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides an apparatus and method for adjusting camber, toe and thrust angle of a wheel spindle. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the hub or the wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the hub and/or wheel structure.

"Radial plane" means a plane that passes perpendicular to the equatorial plane and through the axis of rotation of the wheel.

"Toe" means the angle of the equatorial plane of the tire with respect to the longitudinal axis of the vehicle.

"Camber" means the angle of the equatorial plane of the tire with respect to the vertical axis of the vehicle.

"Outboard" means a side or direction away from the center of the vehicle.

"Inboard" means a side or direction toward the center of the vehicle.

Figure 1:
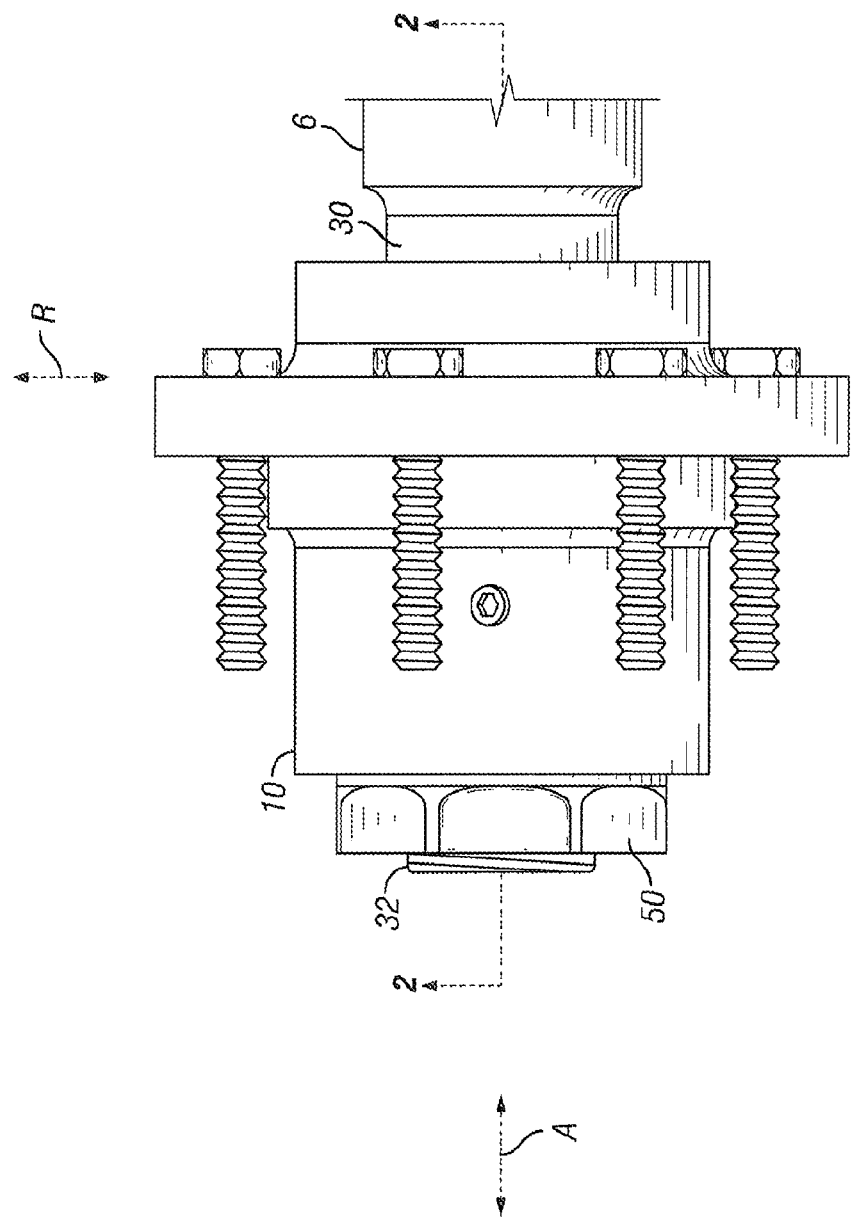
FIG. 1 provides a top view of an assembly of a vehicle hub, axle, axle nut and an embodiment of the invention to adjust camber, toe and thrust angle.

FIG. 1 provides an embodiment of an apparatus for adjusting the alignment of the axis of rotation of a hub 10 relative to a spindle 30 attached at the end of an axle 6. The hub 10 is retained on the axle 6 usually by way of an axle nut, also referred to as a spindle nut 50, which engages a threaded end 32 of the spindle 30. In this particular embodiment, the spindle and hub are typically to what may be observed on a heavy vehicle such as a truck trailer, but it should be understood that the invention disclosed could be used with other vehicle types.

Figure 2:
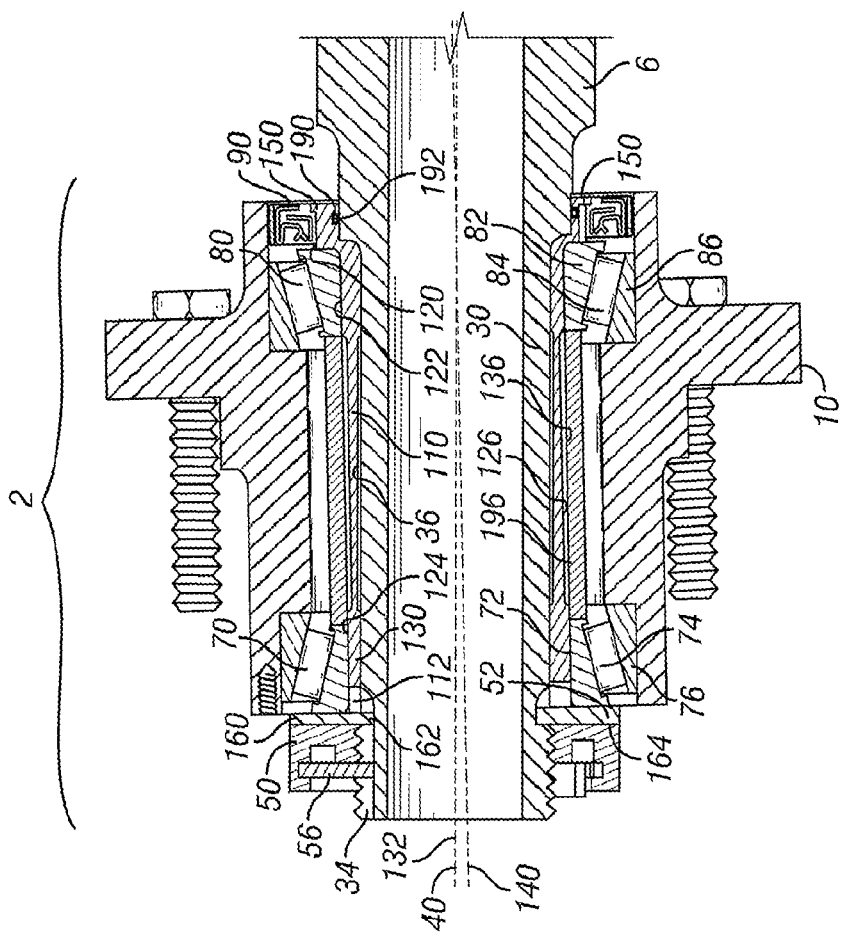
FIG. 2 provides a cross section of the assembly of FIG. 1 as taken along line 2-2 in FIG. 1.

FIG. 2 provides a cross section view of the wheel hub assembly 2 taken on line 2-2 of FIG. 1. The spindle 30 has an outer surface of revolution 36 centered upon an axis 40. In this embodiment a sleeve 110 possessing an inner surface 130 machined to a diameter so as to fit over the outer surface 36 of the spindle 30. The inner surface 130 of the sleeve 110 is a generally cylindrical surface of revolution about an axis 132. The inner surface 130 faces a radially inward direction. When the spindle sleeve 110 is mated with the spindle 30, the spindle axis 40 and the axis of spindle sleeve inner surface axis 132 are positionally and angularly aligned to one another such that the axes 40, 132 are geometrically the same.

The spindle sleeve 110 possesses an outer surface of revolution 136 about an axis 140 which is oriented at a predetermined angle and position relative to the spindle sleeve inner surface axis 132. This predetermined angle may be in a vertical direction (inducing a positive or negative change in camber) or horizontal direction (inducing a positive or negative change in toe) or a combination thereof (inducing a positive or negative change in camber and inducing a positive or negative change in toe). The predetermined angle induces some change in camber and or toe, and thus has a nonzero value. It should be appreciated that while the value of the difference in angle between the outer surface axis 140 and the inner surface axis 132 is nonzero, the difference in angle may be nonzero when viewed in a particular direction. For example the difference in angle may be zero in the horizontal where no change in toe is occurring while having a positive or negative change in angle in the vertical direction where a change in camber is occurring. The outer surface faces a radially outward direction. The angle between the spindle sleeve inner surface axis 132 and the spindle sleeve outer surface axis 140 is chosen depending upon the desired adjustment of the camber, toe and thrust angle of the hub 10 (and attached wheel). The vertical and horizontal placement of the spindle sleeve outer surface axis 140 relative to the spindle sleeve inner surface axis 132 can be chosen maintain alignment of any brake friction surfaces, such as brake pads against a disc, or a brake shoes against a brake drum, such that the brake friction surfaces remain as close to the same alignment as was originally intended prior to the camber, toe and or thrust angle adjustment of the spindle sleeve. The vertical and horizontal placement of the spindle sleeve inner and outer surfaces is determined by choosing the intersection point of the inner surface axis and outer surface axis. In some embodiments, intersection point chosen by positioning the axes such that the intersection is located along said first axis between the brake friction surfaces thereby minimizing brake component offset.

The vertical and horizontal placement and the angular alignment of the spindle sleeve outer surface axis 140 relative to the spindle sleeve inner surface axis 132 is limited to the thickness of the spindle sleeve 110 walls. The walls must be sufficiently thick so as not to deform during handling of the sleeve 110, installation of the sleeve 110 upon the spindle 30, or operation of the vehicle as the loads are transmitted from the vehicle through the spindle 30, spindle sleeve 110, wheel bearings 70, 80, hub 10 and to the road surface.

Some torque can be expected to act upon the spindle sleeve and spindle, for example, such torque may be created by the friction of the bearings 70, 80, seals 90, or lubricant. The spindle sleeve 110, being mounted on a spindle 30 with an outer surface 36 having an axis of revolution about an axis 40, would be free to rotate about axis 40 if not otherwise prevented to do so. In the embodiment shown, a special washer 160, shaped so as not to rotate on the spindle 30 engages the spindle sleeve 110 preventing the sleeve 110 from rotating relative to the axle spindle 30. The washer 160 possesses a tooth 162 protruding radially inward which passes through a slot 112 in the outboard end of the spindle sleeve 110. The tooth 162 extends past the outer surface 36 of the spindle 30 into a keyway 34 formed along the outboard end of the spindle 30. Any rotational forces against the spindle sleeve 110 are transmitted to the washer 160 in this embodiment, which transmits the rotational forces to the spindle 30 which is rotationally fixed relative to the vehicle by the vehicle's suspension. Note that while it is said that the spindle is "rotationally fixed," it is still anticipated that the vehicle suspension linkage may allow some rotation of the axle as the suspension accommodates road surfaces and vehicle loads. For example, such rotation may occur in a suspension system attached to a vehicle with a trailing arm. Any such rotation would be over a relatively small angle and the change in camber, toe and thrust would have a very minor contribution to the overall alignment of the wheel.

The washer 160 possesses an outboard surface 164 aligned perpendicular to the axis 40 of the spindle 30 and an inboard surface 166 aligned perpendicular to the axis 140 of the spindle sleeve outer surface 136. The embodiment shown the outboard surface 164 and the inboard surface 166 of the washer 160 form an angle relative to one another which is identical to the angle formed between the spindle axis 40 and the spindle sleeve outer surface axis 140. The angled opposing faces on the washer 160 enables the outboard surface 164 of the washer 160 to engage the inboard surface 52 of the spindle nut 50 and the inboard face of the washer 160 to engage the outboard face of the outboard bearing cone 72 evenly distributing the axial forces around the circumference of the respective faces.

A bearing spacer 196 allows excess axial forces to transfer through the spacer and not through the bearings 74, 84 to "preset" the bearing preload. This bearing spacer 196 is machined to exact dimensions and matched relative to the dimensions of the hub 10 that define the spacing between the inboard bearing 80 and outboard bearing 70. It should be understood, that while this embodiment incorporates a bearing spacer 196 for ease of installation and ensuring proper bearing preload, other embodiments may omit the spacer 196.

The seal 90 is pressed on the inboard portion of the sleeve 160 and inboard portion of the hub 10. A seal retaining lip 150 protrudes radially outward from the spindle sleeve seal surface 120 and provides a physical stop so that the seal 90 is not pushed off the inboard end of the spindle sleeve 110. The seal 90 illustrated here is a unitized type seal which, however, it should be understood by a person of ordinary skill in the art that other seal type may be used including non-unitized positive contact lip seals.

A spindle sleeve 110 to spindle 30 seal should ideally be formed to prevent leakage of any bearing lubricant, such as oil or grease, from the inner workings of the hub 10. In this particular embodiment, a groove 190 is formed on the inner surface 130 of the spindle sleeve 110. The groove 190 receives an O-ring 192 which presses against the outer surface 36 of the spindle 30 forming a seal. Alternatively, or in addition, a sealant such as an RTV silicone gasket product may be applied to achieve a seal, with or without the groove and/or O-ring.

Figure 3:
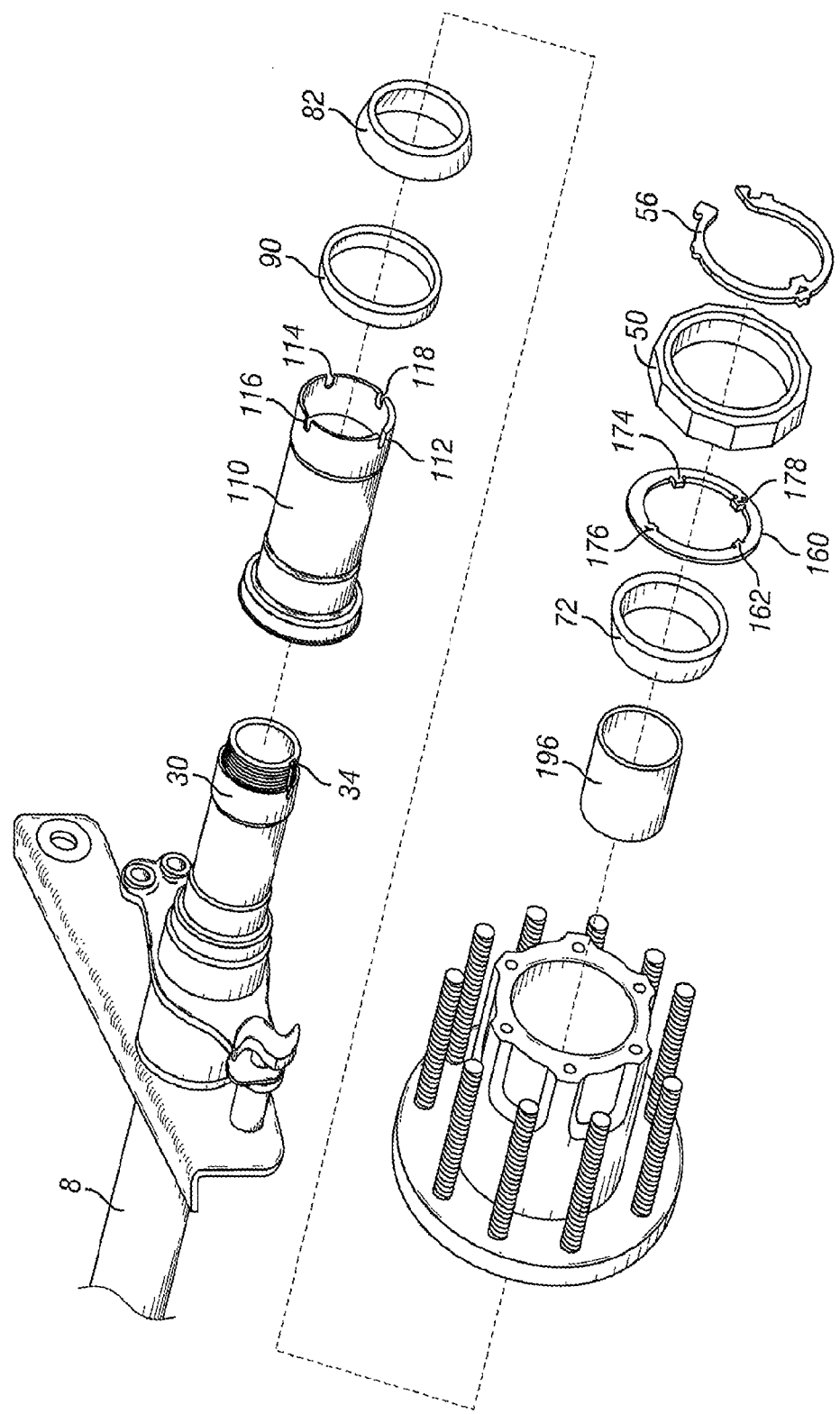
FIG. 3 provides a perspective view of the rear outboard side of the assembly an axle, spindle, spindle sleeve, spindle sleeve washer and spindle nut.

FIG. 3 shows a rear perspective view of an embodiment of the invention and a portion of a suspension of a tractor trailer. Generally, such suspension systems have spindles 30 welded to each end of an axle tube and when the suspension system is unloaded, the spindle axis 40 on each side are aligned and have zero degrees of camber and zero degrees of toe. As discussed above, the vehicle dynamics and loads placed upon the axle by the vehicle weight and cargo deflect the axle causing the spindles 30 to take on a small amount of camber. The camber sleeve 110 allows adjustment of the wheel camber, toe and thrust angles by a desired amount.

Shown here is a typical spindle 30 known as a "TP series" spindle or "P" spindle. Other spindle types having various geometries exist and it should be obvious to an ordinary person skilled in the art that modifications to the current embodiment can be made within the scope of the claimed invention to accommodate other spindle types, including type "TN," "N," "TQ," "Q," "TR," or "R" series spindles. Illustrated here in FIG. 3, the keyway 34 is positioned on the rear of the axle at approximately 15 degrees down from horizontal. The keyway extends into the spindle wall a portion of the thickness of the spindle wall and the length of the keyway 34 extends along in the direction of the spindle axis 40.

The spindle sleeve 30, shown in this embodiment, possesses a plurality of slots 112, 114, 116, and 118. Each slot 112, 114, 116, and 118 aligns with a corresponding spindle sleeve washer tooth 162, 174, 176 and 178. In this embodiment, three of the teeth 174, 176 and 178 extend the thickness of the spindle sleeve 110 wall at their respective locations. One spindle sleeve washer tooth 162 extends past the thickness of the spindle sleeve 110 wall and extends into the spindle sleeve keyway 34. Engagement of the tooth 162 into the keyway 34 prevents rotation of the spindle sleeve about the spindle axis 40. One manner to identify the position of the spindle teeth 163, 174, 176, 178 and corresponding slots 112, 114, 116, 118 is to assign the radially oriented positions about the axis of the spindle of or tire into degrees and specifying an azimuth angle from a set point, such as top vertical point above the axis, or referencing a horizontal line intersecting the axis Spindle sleeve washer teeth 162 and 174 and spindle sleeve slots 112 and 114 are positioned at 15-degrees below horizontal from the spindle axis 40, or in other words 105-degrees from a top vertical position. Spindle sleeve washer teeth 176 and 178 and spindle sleeve slots 116 and 118 are aligned vertically, or in other words at 0-degrees and 180-degrees respectively. Arrangement of spindle sleeve washer teeth 162 and 174 and spindle sleeve slots 112, 114 at 15-degrees below the horizontal ensures there are only two ways to align the spindle sleeve washer 160 on the spindle sleeve 110. Since one tooth 162 of the teeth 162, 174 positioned at 15 degrees below the horizontal are longer to engage the keyway 34 on the spindle 30, the washer 160 will only engage the spindle sleeve 110 and spindle 30 assembly in one way, helping to reduce the chance for incorrect assembly.

With two slots 112, 114 on the spindle sleeve positioned at 105-degrees, as with this particular embodiment, the spindle sleeve 110 may be used on either the left or right side of the vehicle while maintaining the vertical orientation of camber and toe adjustment built into the camber sleeve by aligning one slot 112 with the keyway 34 on one side of the vehicle, or aligning the other slot 114 with the keyway 34 when the camber sleeve is used on the other side of the vehicle. A person of ordinary skill in the art would understand that different axle manufacturers may align the spindle keyways 34 at different locations around the spindle axis 40 and that the alignment tooth 162 and corresponding slot 112 may be manufactured at a different location on the washer 160 or spindle sleeve 110 to accommodate the keyway location. Some manufacturers may even randomly position the spindle keyway. In such instances, care of specifying or selecting a spindle and corresponding spindle washer must be taken by identifying the azimuth location of the keyway 34 and ensuring that at least one slot is located at a corresponding azimuth location on the spindle sleeve 110 and the an alignment tooth 162 of sufficient length is located at a proper azimuth location on the corresponding washer 160.

The spindle nut 50 shown here is a locking spindle nut having a spindle nut lock ring 56. Such axle spindle nuts are available commercially under the brand name "PRO-TORQ®" by STEMCO. Other spindle nuts may be used within the scope of the claimed invention, including using a castle nut, a nut and retaining washer, or dual nut and a lock plate.

Figure 4:
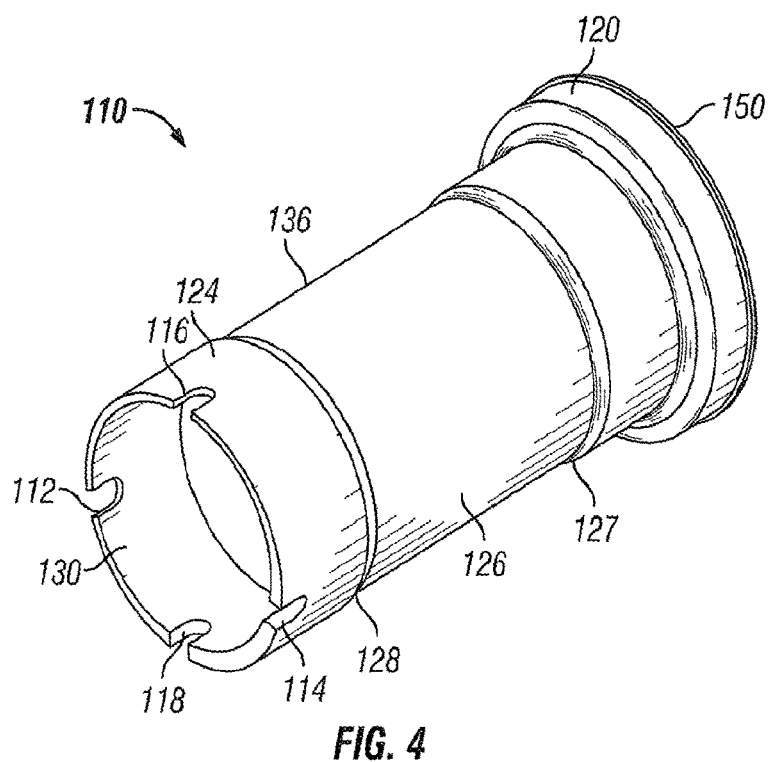
FIG. 4 is an outboard perspective view of a spindle sleeve.

FIG. 4 shows an outboard perspective view of the spindle sleeve 110. The sleeve wall thickness, measured from the inner surface 130 to the outer surface of the sleeve 136 varies depending upon azimuth location and axial location along the sleeve's length for each variation of sleeves which are designed to change the camber or toe of the wheel. The most inboard portion of the sleeve contains a radially outward protruding seal retaining lip 150 to prevent dislodgement of the seal off the inboard end of the sleeve upon installation of the seal and/or hub. An inboard spindle sleeve bearing surface 122 is manufactured to a size so as to receive a cone or inner race of the inboard bearing 80. An outboard spindle sleeve bearing surface 124 is manufactured to a size so as to receive a cone or inner race of the outboard bearing 70. A reduced diameter surface 126 between the inboard bearing surface 122 and outboard bearing surface 124 having a diameter less than the inboard bearing surface 124 eases assembly of the inboard bearing 80 onto the spindle sleeve. In this embodiment, the reduced diameter surface 126 transitions to the inboard bearing surface 122 with an angled chamfer 127 and likewise the reduced diameter surface 126 transitions to the outboard bearing surface 124 with a second angled chamfer 128. The inboard bearing surface 122 and outboard bearing surface 124 diameters shown in this embodiment are identical, however, other embodiments may have the outboard bearing surface 124 smaller than the inboard bearing surface 122, such as found in TN/TQ series bearings or TR series bearings.

Figure 5:
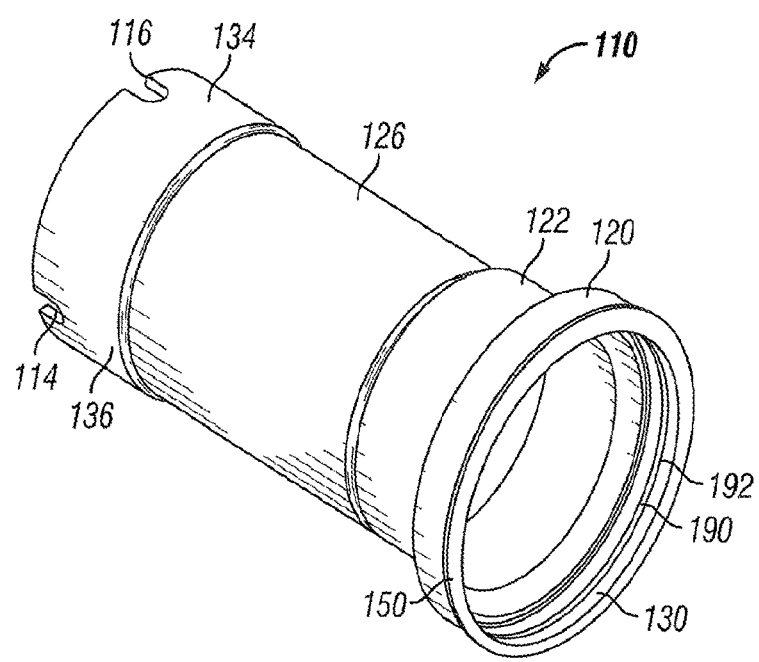
FIG. 5 is an inboard perspective view of the spindle sleeve.

FIG. 5 shows an inboard perspective view of the spindle sleeve 110. The spindle sleeve seal surface 120 on this embodiment has an appreciable larger diameter than the inboard bearing surface 122. Other embodiments within the scope of the invention may have a seal surface 120 diameter equal to that of the inboard bearing surface. In this embodiment, the inboard portion of the spindle sleeve inner surface 130 possesses a groove 190 in which a seal 192, such as an o-ring is placed to prevent leakage of lubricant the inner part of the hub from or ingress of contaminants.

Figure 6:
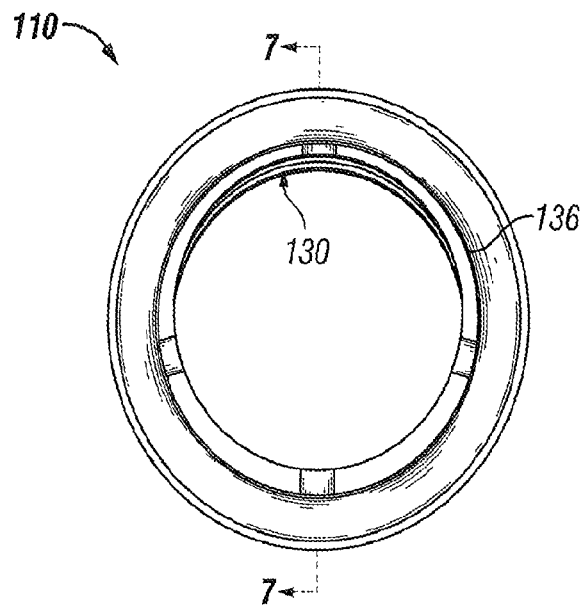
FIG. 6 is an outboard view of the spindle sleeve.

FIG. 6 shows a side view of the spindle sleeve 110 from an outboard position along the spindle sleeve 110 outer surface axis 140. The wall on the outboard portion of the spindle sleeve 110 in this embodiment is thinner at the top than at the bottom as a result of the relative positioning of the outer surface axis 140 and the spindle sleeve inner surface axis 132. The inner surface 130 can be observed along the top half of the spindle sleeve from this view since the inner surface axis 132 is angled down and away from the point of view of the figure. In this embodiment, no appreciable toe angle is present; however it can be appreciated that a variation in the angle of the inner surface axis 132 with respect to the outer surface axis 140 in the horizontal direction of a different embodiment of the invention would result in a change in the toe angle of the vehicle.

Figure 7:
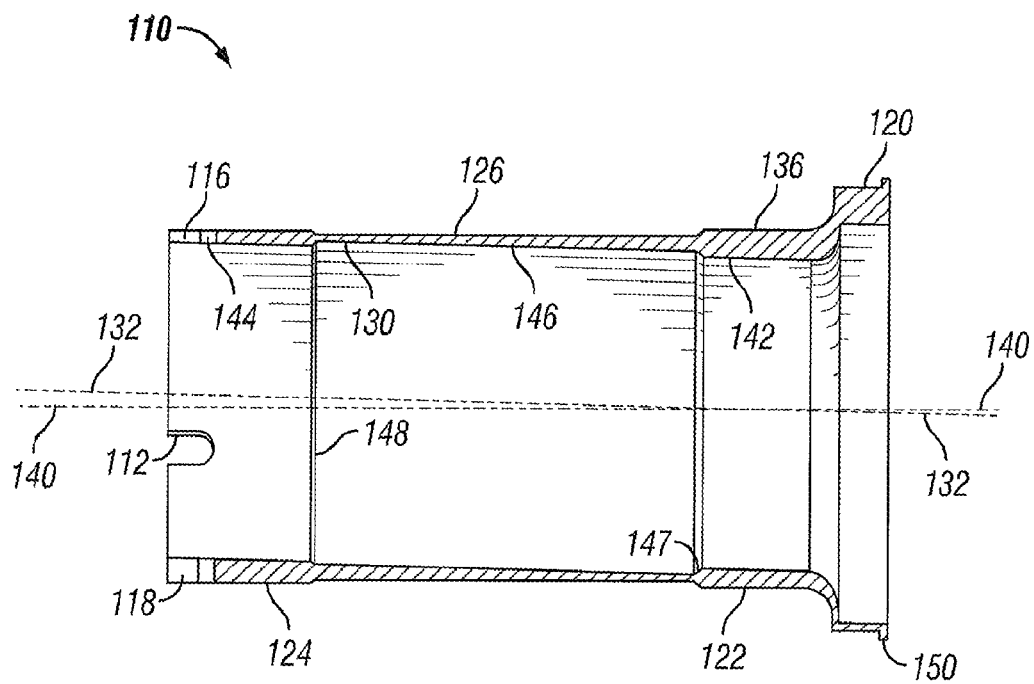
FIG. 7 is a sectional view of the spindle sleeve taken along line 7-7 in FIG. 6.

FIG. 7 shows a sectional view of an embodiment of the spindle sleeve 110 taken on line 7-7 of FIG. 6. The embodiment shown here possesses a spindle sleeve reduced diameter surface 126 in addition to a spindle sleeve enlarged diameter inner surface 146. On the inner surface 130 of the spindle sleeve 110, the spindle sleeve possesses an enlarged diameter inner surface 146 which is positioned between an inboard spindle mating inner surface 142 and an outboard spindle mating inner surface 144. The spindle mating surfaces 144, 142 are sized to mate with the spindle 30 outer surface 36. The enlarged diameter inner surface 146 of the spindle sleeve 110 eases assembly of the sleeve onto the spindle by providing additional clearance. An angled chamfer 148 is used to transition between the outboard spindle mating inner surface 144 and the spindle sleeve enlarged diameter inner surface 146. A second angled chamfer 147 is used to transition between the enlarged diameter inner surface 146 and the inboard spindle mating inner surface 142. It can be observed in this figure how the positioning and angle of the inner surface axis 132 relative to the outer surface axis 140 affects the spindle sleeve 110 wall thickness.

Figure 8:
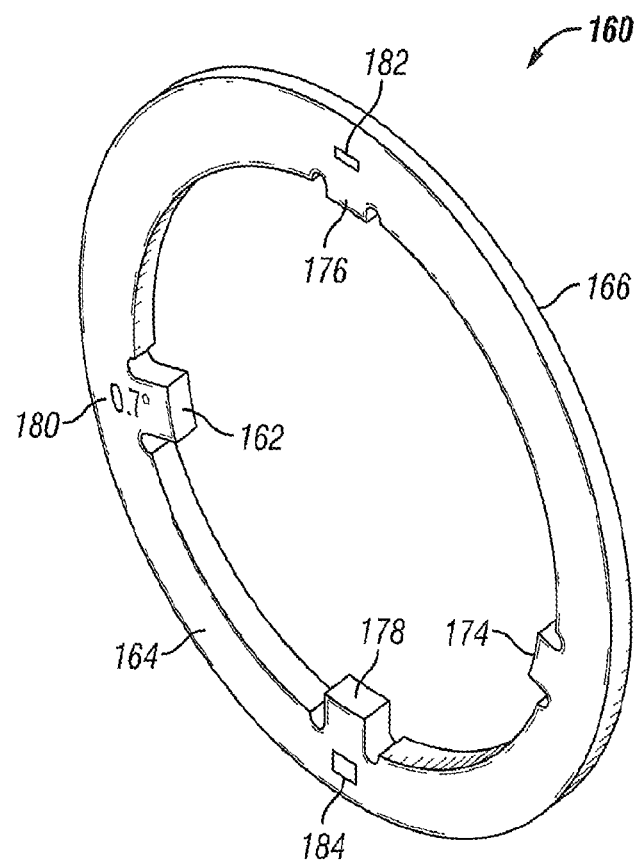
FIG. 8 is a perspective view of an axle washer.

FIG. 8 shows a perspective view of the spindle sleeve washer 160. Shown here is a 0.7 degree angled washer to match a corresponding spindle sleeve 110 having a 0.7 degree angle between the inner surface axis 132 and outer surface axis 140. This embodiment of the washer 160 possesses a plurality of teeth 162, 174, 176, 178 to engage corresponding slots 112, 114, 116, 118 in the spindle sleeve 110. While this embodiment shows four teeth and corresponding slots, other embodiments may have a single tooth and slot or a different number of teeth and corresponding slots. At least one tooth 162 extends radially inward a depth greater than the thickness of the sleeve 110 at that location so as to engage a corresponding at least one keyway 34 in the spindle 30. Optional markings 180, 182, 184 may be made on the washer 160. For example a thick marking 184 may identify the thick portion, a thin marking 182 may identify the thin side and a degree marking 180 may identify the angle between the outboard face 164 and inboard face 166 of the spindle sleeve washer 160. Other markings may be present to aid in assembly or orientation, including markings to indicate the degree of toe, camber, top, bottom, vehicle position, right hand side, left hand side, inboard or outboard position, etc.

Figure 9:
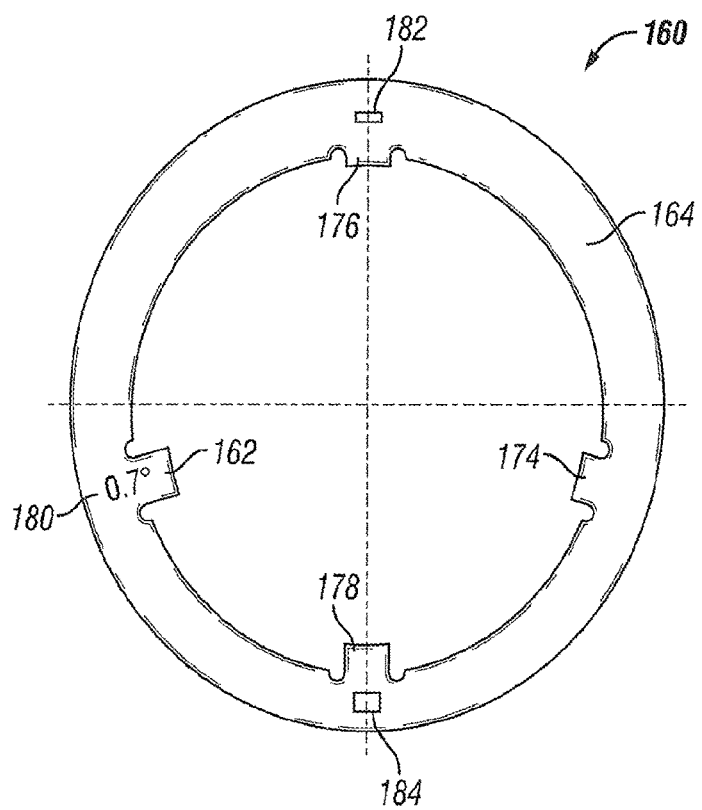
FIG. 9 is outboard view of the axle washer.

FIG. 9 shows an outboard side view of the outboard face of the spindle sleeve washer 160.

Figure 10:
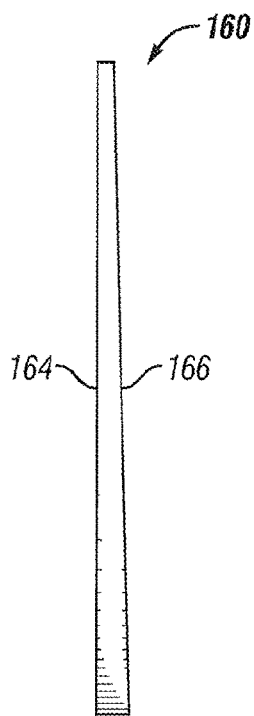
FIG. 10 is side view of the axle washer.

FIG. 10 shows a radial front view of the washer 160 showing the taper formed by the angle of the outboard face surface 164 relative to the inboard face surface 166. In this embodiment the angle, formed between the inboard face 166 and the outboard face 164 is 0.7 degrees, which corresponds to the embodiment of the spindle sleeve having 0.7 degree positive camber and 0 degrees toe. Should a different embodiment possess some degree of both toe and camber, the angle of the washer faces 164, 166 should be chosen to be equal to the angular offset of the outer surface 136 axis 140 from the inner surface 130 axis 132 of the camber sleeve.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for inducing a desired angular orientation of an axis of revolution of a tire about a spindle, said apparatus comprising:
   a sleeve which includes an inner surface and an outer surface, an inboard end and an outboard end, said inner surface of said sleeve aligned with a surface of revolution about a first axis, said outer surface of said sleeve aligned with a surface of revolution about a second axis, said second axis positioned at a predetermined angle compared to said first axis, said outboard end includes at least one slot, said at least one slot comprising a first slot extending from said inner surface to said outer surface; and
   a washer which includes an outboard surface, an inboard surface, an inner surface forming an aperture, said aperture extending from said outboard surface to said inboard surface, said washer includes at least one tooth protruding radially inward from said inner surface for engaging said first slot of said sleeve;
   wherein when said at least one tooth of said washer engages said at least one slot of said sleeve and said outboard surface of said washer is positioned perpendicular to said first axis of said sleeve, said inboard surface of said washer is perpendicular to said second axis of said sleeve.

2. The apparatus of claim 1 wherein when said washer is positioned upon said outboard side of said sleeve, one of said at least one tooth protrudes past said inner surface of said sleeve.

3. The apparatus of claim 2 wherein said tooth engages a slot positioned upon said spindle.

4. The apparatus of claim 1 wherein said outboard end of said sleeve possesses a plurality of slots.

5. The apparatus of claim 4 wherein said washer possesses a plurality of teeth.

6. The apparatus of claim 5 wherein each of said plurality of teeth engage each of said plurality of slots.

7. The apparatus of claim 4 wherein two slots of said plurality of slots are positioned at an angle in the range of 133 degrees to 163 degrees from each other.

8. The apparatus of claim 4 wherein two slots of said plurality of slots are positioned 148 degrees from each other.

9. The apparatus of claim 5 wherein said teeth, and said corresponding slots are positioned in an asymmetric pattern such that said teeth and said slots all engage only if said inboard surface of said washer faces in the direction of the inboard end of said sleeve, and said outboard surface of said washer faces in the direction of the outboard end of said sleeve.

10. The apparatus of claim 5 wherein said teeth, and said corresponding slots are positioned in a symmetric pattern whereby said teeth and said slots all engage only if the washer is rotated in the correct direction whereby the washer may be reversed and used on either the left or right sides of the vehicle.

11. The apparatus of claim 1 wherein said second axis is positioned at a predetermined intersection point with said first axis.

12. The apparatus of claim 11 wherein said predetermined intersection point is located along said first axis between the brake friction surfaces.

13. The apparatus of claim 1 wherein said sleeve further includes a lip extending radially outward along the inboard end of said sleeve.

14. The apparatus of claim 1 wherein said sleeve possesses a circumferential groove positioned on said inner surface on said inboard end of said sleeve, said groove adapted to receive a seal.

15. The apparatus of claim 14 wherein said seal is an o-ring.

16. An apparatus for inducing a desired angular orientation of an axis of revolution of a tire about a spindle, said apparatus comprising:
a sleeve which includes an inner surface and an outer surface, an inboard end and an outboard end, said inner surface of said sleeve aligned with a surface of revolution about a first axis, said outer surface of said sleeve aligned with a surface of revolution about a second axis; and
a washer that includes an outboard surface, an inboard surface, and an inner surface that forms an aperture, said aperture extending from said outboard surface to said inboard surface;
wherein said outboard surface of said washer is positioned perpendicular to said first axis of said sleeve, said inboard surface of said washer is perpendicular to said second axis of said sleeve;
wherein said second axis positioned at a predetermined angle compared to said first axis, said outboard end includes a plurality of slots, said plurality of slots extending from said inner surface to said outer surface; and
said washer includes a plurality of teeth protruding radially inward from said inner surface for engaging said plurality of slots, wherein each one of said plurality of teeth are disposed within individual ones of said plurality of slots.

17. The apparatus of claim 16 wherein when said washer is positioned upon said outboard side of said sleeve, one of said teeth protrudes past said inner surface of said sleeve.

18. The apparatus of claim 17, wherein said sleeve possesses a circumferential groove positioned on said inner surface on said inboard end of said sleeve, said groove adapted to receive a seal, and further comprising an o-ring located within the circumferential groove, wherein two of the slots are positioned at an angle in the range of 133 degrees to 163 degrees from each other.

\* \* \* \* \*